(12) United States Patent
Yamao et al.

(10) Patent No.: US 10,862,282 B2
(45) Date of Patent: Dec. 8, 2020

(54) PROTECTOR FOR WIRE HARNESS, AND METHOD FOR MANUFACTURING WIRE HARNESS

(71) Applicant: Yazaki Corporation, Tokyo (JP)

(72) Inventors: Yoshimichi Yamao, Toyota (JP); Kazuya Takahashi, Toyota (JP); Katsuya Yoshimura, Toyota (JP); Masayoshi Ogawa, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 288 days.

(21) Appl. No.: 15/994,622

(22) Filed: May 31, 2018

(65) Prior Publication Data

US 2018/0278033 A1 Sep. 27, 2018

Related U.S. Application Data

(63) Continuation of application No. PCT/JP2016/085964, filed on Dec. 2, 2016.

(30) Foreign Application Priority Data

Dec. 3, 2015 (JP) .................. 2015-236837

(51) Int. Cl.
*H01R 43/00* (2006.01)
*H02G 3/04* (2006.01)
(Continued)

(52) U.S. Cl.
CPC ....... *H02G 3/0437* (2013.01); *B60R 16/0215* (2013.01); *H02G 3/0418* (2013.01); *H01B 7/0045* (2013.01)

(58) Field of Classification Search
CPC .. H02G 3/0437; H02G 3/0418; H01B 7/0045; B60R 16/0215
See application file for complete search history.

(56) References Cited

U.S. PATENT DOCUMENTS

| 5,739,470 A | 4/1998 | Takeda |
| 6,861,589 B2 * | 3/2005 | Katsumata ........... H02G 3/0487 174/68.3 |

(Continued)

FOREIGN PATENT DOCUMENTS

| JP | 2003-333723 A | 11/2003 |
| JP | 2005-295728 A | 10/2005 |

(Continued)

OTHER PUBLICATIONS

English translation of Written Opinion dated Jan. 10, 2017, issued by the International Searching Authority in counterpart International Application No. PCT/JP2016/085964 (PCT/ISA/237).

(Continued)

*Primary Examiner* — Paul D Kim
(74) *Attorney, Agent, or Firm* — Sughrue Mion, PLLC

(57) ABSTRACT

A protector includes a body portion defining a plurality of paths through which electric wires of a wire harness can pass, an electric holding portion and a cover portion. The electric wire holding portion includes a holding piece which can be disposed so as to pass through an upper side of a first path and extend toward a partition wall from a first side wall, an engaging piece which can be disposed so as to pass through a lower side of a second path and extend toward a second side wall from the partition wall, and an intermediate piece which connects the holding piece and the engaging piece, and is fixable to the body portion.

6 Claims, 10 Drawing Sheets

(51) Int. Cl.
  *B60R 16/02* (2006.01)
  *H01B 7/00* (2006.01)

(56) References Cited

U.S. PATENT DOCUMENTS

| | | | |
|---|---|---|---|
| 8,847,073 B2* | 9/2014 | Tokunaga | B60R 16/0215 |
| | | | 174/68.1 |
| 9,136,678 B2* | 9/2015 | Takaya | B60R 16/0215 |
| 9,581,270 B2* | 2/2017 | Peterson | H02G 3/0487 |
| 2003/0213607 A1 | 11/2003 | Katsumata et al. | |
| 2005/0217888 A1 | 10/2005 | Arai et al. | |
| 2009/0211781 A1 | 8/2009 | Suzuki | |

FOREIGN PATENT DOCUMENTS

| | | | |
|---|---|---|---|
| JP | 2008-92638 A | 4/2008 |
| JP | 2012-90505 A | 5/2012 |

OTHER PUBLICATIONS

International Preliminary Report on Patentability dated Jun. 5, 2018, issued by the International Searching Authority in counterpart International Application No. PCT/JP2016/085964 (PCT/IB/373).
International Search Report dated Jan. 10, 2017, issued by the International Searching Authority in counterpart International Application No. PCT/JP2016/085964 (PCT/ISA/210).
Written Opinion dated Jan. 10, 2017, issued by the International Searching Authority in counterpart International Application No. PCT/JP2016/085964 (PCT/ISA/237).
Office Action dated Aug. 8, 2017, issued by the Japanese Patent Office in counterpart Japanese Application No. 2015-236837.

\* cited by examiner

PROTECTOR FOR WIRE HARNESS, AND METHOD FOR MANUFACTURING WIRE HARNESS

BACKGROUND

1. Technical Field

The present invention relates to a protector for a wire harness and a method for manufacturing the wire harness.

2. Related Art

There has been disclosed a protector for a wire harness which defines a path (cavity or space) inside thereof, capable of housing electric wires configuring the wire harness. The protector for the wire harness is generally used as a fixing tool when the wire harness is routed in a vehicle body of an automobile or the like while protecting the electric wires housed inside thereof. Hereinafter, for convenience, the protector for the wire harness is simply referred to as "protector".

For example, one of conventional protectors (hereinafter, referred to as "conventional protector") includes a tub-shaped protector body having a bottom wall and two side walls, and a cover for covering an opening portion at an upper end side of the protector body.

After the electric wires are housed in the path for defining the bottom wall and two side walls of the protector body, the conventional protector houses the electric wires by mounting and fixing the cover to the protector body. (For example, see JP-A-2005-295728.)

SUMMARY OF INVENTION

The wire harness is manufactured by a series of manufacturing steps containing housing the electric wires in the protector. More particularly, the wire harness is generally manufactured by mounting a plurality of electric wires and various routing members (for example, a protector, a grommet and a clamp or the like) mounted to the electric wires on dedicated workbenches (that is, a jig plate or the like). However, since there are a variety of the electric wires and the routing members configuring the wire harness, the wire harness is generally manufactured by a plurality of manufacturing steps on a plurality of workbenches.

In these manufacturing processes, in a case where the electric wires (the wire harness in a manufacturing process) to which the protector is mounted are moved from one workbench to another workbench, in order to prevent the protector being detached from the electric wires, the cover is generally mounted to the protector body of the conventional protector before the electric wires are moved. In other words, mounting the cover to the protector body (housing the electric wires in the protector) is generally finished on each workbench.

Therefore, when the number of times of movement among the workbenches is increased because of a complex structure of the wire harness or the like, the number of the protectors mounted to the wire harnesses is also increased. However, in the viewpoints of workability in manufacturing the wire harness, routing performance in mounting the manufactured wire harness to the vehicle or the like, and manufacturing cost of the wire harness, or the like, it is desirable that the number of the protectors is as small as possible.

The present invention has been made in view of the above circumstances, and an object thereof is to provide a protector for a wire harness which can reduce the number of the protectors required for the wire harnesses, and a method for manufacturing the wire harness used such a protector.

In order to achieve the above objects, the protector for the wire harness according to the present invention is characterized by the following (1) to (4).

(1)

a protector for a wire harness, which is a protector for a wire harness including a body portion for defining a plurality of paths through which electric wires configuring the wire harness is capable of passing, an electric wire holding portion for holding the electric wire, and a cover portion for covering the body portion and the electric wire holding portion, characterized in that:

the body portion contains a first path and a second path, as the plurality of the paths, which are partitioned by a partition wall, and also includes a first side wall opposite to the partition wall with the first path interposed therebetween and a second side wall opposite to the partition wall with the second path interposed therebetween, and the electric wire holding portion includes a holding piece which is capable of being disposed so as to pass through an upper side of the first path and extend toward the partition wall from the first side wall, an engaging piece which is capable of being disposed so as to pass through a lower side of the second path and extend toward the second side wall from the partition wall, and an intermediate piece which connects the holding piece and the engaging piece, and is fixable to the body portion.

(2)

The protector for the wire harness according to above-mentioned (1), wherein the partition wall includes a communication portion which communicates the first path and the second path, and the intermediate piece is capable of being disposed so as to block the communication portion.

(3)

The protector for the wire harness according to above-mentioned (2), wherein the body portion includes a third path into which the first path and the second path are merged, and the partition wall includes the communication portion at a position away from a merging position between the first path and the second path.

(4)

The protector for the wire harness according to any one of above-mentioned (1) to (3), wherein the electric wire holding portion is configured such that the holding piece is rotatably connected to the first side wall via a hinge portion and the engaging piece includes an engaging portion whose engaging piece is engageable with the second side wall, and the body portion includes an engaged portion corresponding to the engaging portion.

According to the wire harness having the configuration of above-mentioned (1), after a part of a plurality of electric wires (a first electric wire group) forming the wire harness are housed in the first path of the protector, the first electric wire group housed in the first path can be held by the holding piece of the electric holding portion passing through the upper side of the first path (a side close to the cover portion) if the electric wire holding portion is fixed to the protector. Therefore, different from the conventional protector, the electric wire group housed in the first path can be held without mounting the cover portion to the body portion.

Further, at this time, since the engaging piece of the electric wire holding portion is disposed so as to pass through the lower side of the second path (a side away from the cover portion), the second path is kept in a state capable of housing the electric wires. In other words, since the first path houses and holds the electric wires (the first electric wire group) and the second path is kept in a state capable of housing electric wires (a second electric wire group), the wire harness can be moved from one workbench to another workbench in a manufacturing process without mounting the cover portion to the body portion (that is, without finishing housing the electric wires in the protector).

Further, for example, on another workbench having a destination, after the other part of the plurality of the electric wires (the second electric wire group) is housed in the second path so as to pass through the upper side of the engaging piece, the second electric wire group housed in the second path can be held by the cover portion if the cover portion is mounted and fixed to the body portion.

In this manner, according to the protector for the wire harness having the configuration, it is not necessary to finish mounting the protector to each workbench. Therefore, compared to a case where mounting the protector to each workbench is finished like the conventional protector, the number of the protectors required for the wire harnesses can be reduced.

Incidentally, in a case where an electric wire holding portion for holding the electric wires housed in the first path and an electric wire holding portion for holding the electric wires housed in the second path are regarded as separate members which are independent from each other, although it is not necessary to finish mounting the protector to each workbench, the engaging portions for fixing to the body portion are provided on the electric wire holding portions respectively, and the engaged portions corresponding to the engaging portions are provided on the body portion. Consequently, compared to the protector for the wire harness having the configuration, the number of the engaging portions and the engaged portions are increased when the electric wire holding portions are regarded as a plurality of separate members. Because of the engaging portions and the engaged portions increased in this manner, the volumes of the paths for holding the electric wires are decreased, and the number and kinds of the electric wires which can be housed in the paths are reduced. Therefore, compared to a case where a plurality of electric holding portions are provided in the paths respectively, the protector for the wire harness having the configuration has an advantage that the volumes of the paths in the protector can be used maximally.

According to the protector for the wire harness having the configuration of above-mentioned (2), a part of the electric wire holding portion (the intermediate piece) is disposed so as to block a cut out portion (the communication portion) formed in the partition wall, and the intermediate piece becomes a part of the partition wall. Therefore, compared to a case where the communication portion is not present in the partition wall and the entire intermediate piece is disposed in the path (the first path or the second path), the projection amount of the intermediate piece projected to the paths becomes small, and the volumes of the paths are increased. As a result, the number and kinds of the electric wires capable of being housed in the paths can be increased. Consequently, according to the protector for the wire harness having the configuration, the volumes of the paths in the protector can be used maximally.

According to the protector for the wire harness having the configuration of above-mentioned (3), even in a case where an electric wire (that is, an electric wire which is not directed to the third path) of the electric wires housed in the protector from the first path to the second path through the merging position is present, the electric wire will not enter the communication portion since the electric wire contacts with the partition wall adjacent to the merging position. Therefore, the electric wire will not be interposed between the electric wire holding portion (the intermediate piece or the like) and the body portion. Consequently, compared to a case where the communication portion at a position adjacent to the merging position is present (in other words, the intermediate piece of the electric wire holding portion at the position adjacent to the merging position is present), it is possible to prevent damage of the electric wire, or the like.

According to the protector for the wire harness having the configuration of above-mentioned (4), the electric wire holding portion can be easily fixed to the body portion by rotating the electric wire holding portion around the hinge portion. Therefore, compared to a case where the body portion and the electric wire holding portion are separate members separated from each other, the workability of the step of housing the electric wires in the first path can be improved.

Further, in order to achieve the above objects, the method for manufacturing the wire harness according to the present invention is characterized by the following (5) to (6).

(5)

A method for manufacturing a wire harness, which is a method for manufacturing a wire harness including a plurality of electric wires and a protector defining a plurality of paths inside, characterized in that:

the protector includes:

a body portion, which contains a first path and a second path, as the plurality of the paths, which are partitioned by a partition wall, and includes a first side wall opposite to the partition wall with the first path interposed therebetween and a second side wall opposite to the partition wall with the second path interposed therebetween;

an electric wire holding portion, which includes a holding piece which is capable of being disposed so as to pass through an upper side of the first path and extend toward the partition wall from the first side wall, an engaging piece which is capable of being disposed so as to pass through a lower side of the second path and extend toward the second side wall from the partition wall, and an intermediate piece which connects the holding piece and the engaging piece, and is fixable to the body portion; and a cover portion, which covers the body portion and the electric wire holding portion, and the method for manufacturing the wire harness contains:

a first step of housing a first electric wire group which is a part of the plurality of the electric wires in the first path;

a second step of holding the first electric wire group in the first path by the holding piece and fixing the electric wire holding portion to the body portion by the engaging piece;

a third step of housing a second electric wire group which is the other part of the plurality of the electric wires in the second path such that the second electric wire group passes through an upper side of the engaging piece; and a forth step of holding the second electric wire group in the second path by fixing the cover portion in the body portion so as to cover the body portion and the electric wire holding portion.

(6)

The method for manufacturing the wire harness according to above-mentioned (5), wherein the third step contains a step of mounting a routing component to the second electric wire group, and a step of disposing the second electric wire group in the second path such that at least a part of the routing component is positioned inside the protector.

According to the method for manufacturing the wire harness having the configuration of above-mentioned (5), after a part of the plurality of the electric wires (the first electric wire group) forming the wire harness is housed in the first path of the protector, the electric wire holding portion is fixed to the protector, and thereby the first electric wire group housed in the first path can be held by the holding piece of the electric holding portion passing through the upper side of the first path (a side close to the cover portion). Therefore, different from the conventional protector, the electric wire group housed in the first path can be held without mounting the cover portion to the body portion. Further, at this time, since the engaging piece of the electric wire holding portion is disposed so as to pass through the lower side of the second path (a side away from the cover portion), the second path is kept in a state capable of housing the electric wires. In other words, since the first path houses and holds the electric wires (the first electric wire group) and the second path is kept in a state capable of housing the electric wires, the wire harness can be moved from one workbench to another workbench in a manufacturing process without mounting the cover portion to the body portion (that is, without finishing housing the electric wires in the protector).

Further, for example, on another workbench having a destination, after the other part of the plurality of the electric wires (the second electric wire group) are housed in the second path so as to pass through the upper side of the engaging piece, the cover portion is mounted and fixed to the body portion, and thereby the second electric wire group housed in the second path can be held by the cover portion.

In this manner, according to the method for manufacturing the wire harness having the configuration, it is not necessary to finish mounting the protector to each workbench. Therefore, compared to a case where mounting the protector to each workbench is finished by using the conventional protector, the number of the protectors required for the wire harnesses can be reduced in the method for manufacturing the wire harness having the configuration.

According to the method for manufacturing the wire harness having the configuration of above-mentioned (6), at least a part of the routing component (for example, a grommet and a clamp, and a tape wound on the electric wires for fixing the grommet and the clamp to the electric wires) is positioned inside the protector. Therefore, compared to a case where the entire routing component is exposed outside the protector, the damage of the routing component can be reduced. Further, when the wire harness is routed in the vehicle or the like, the routing component along with the protector can be fixed to the vehicle or the like. Besides, the workability of manufacturing the wire harness is improved by integrally handling the routing component and the protector.

According to the present invention, the protector for the wire harness, the number of which required for a wire harness can be reduced, and the method for manufacturing the wire harness by using such a protector can be provided.

The present invention has been briefly described above. Further, the details of the present invention will be clarified by reading a mode for carrying out the invention (hereinafter, referred to as "embodiment") described below with reference to the drawings.

DETAILED DESCRIPTION OF EMBODIMENTS

Hereinafter, an embodiment of a protector for a wire harness and a method for manufacturing the wire harness according to the present invention will be described with reference to the drawings.

Embodiment

Figure 1:
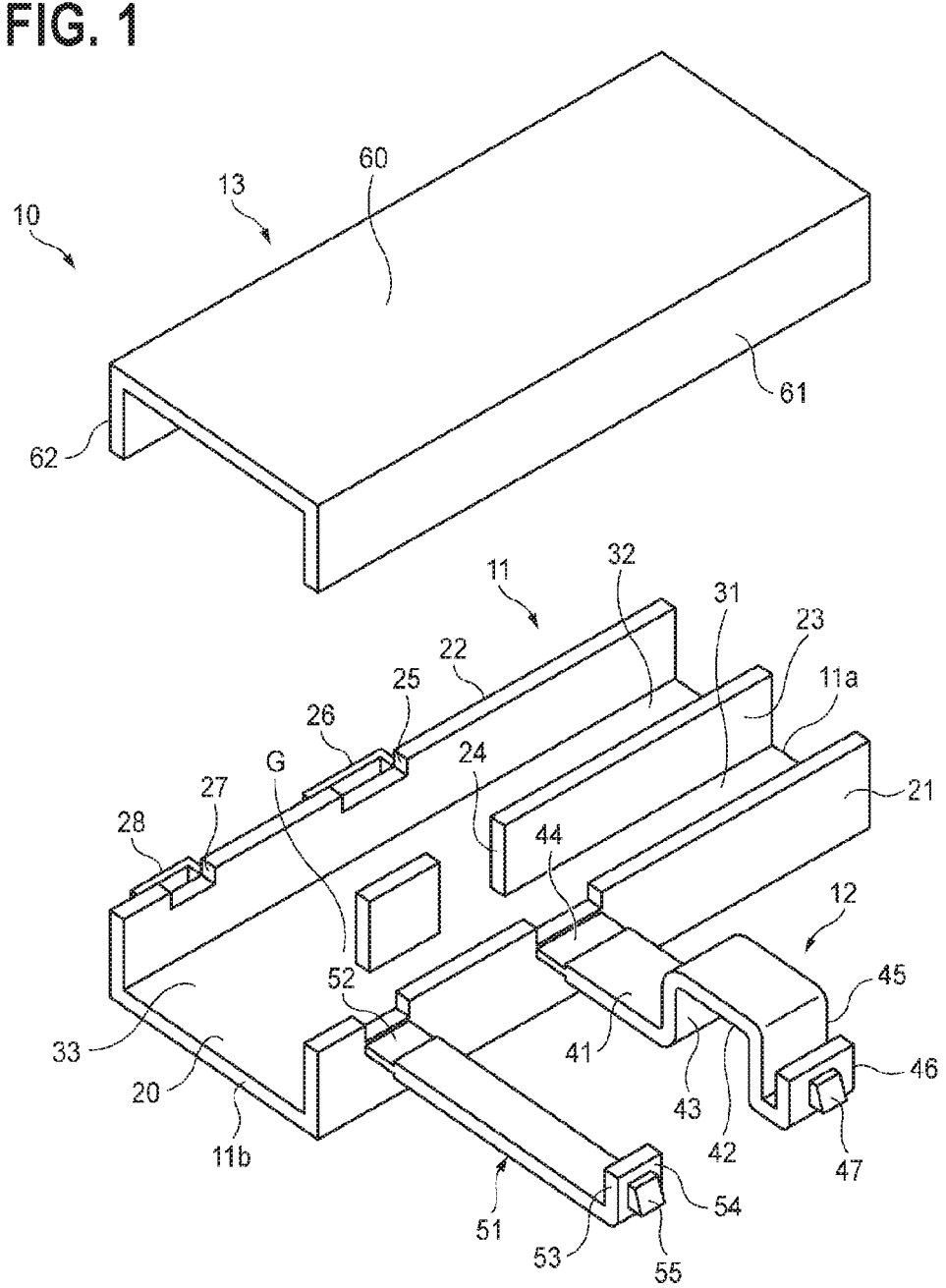
FIG. 1 is a perspective view in a case where an electric wire holding portion is disposed at a retreat position in a protector for a wire harness according to an embodiment.
Figure 2:
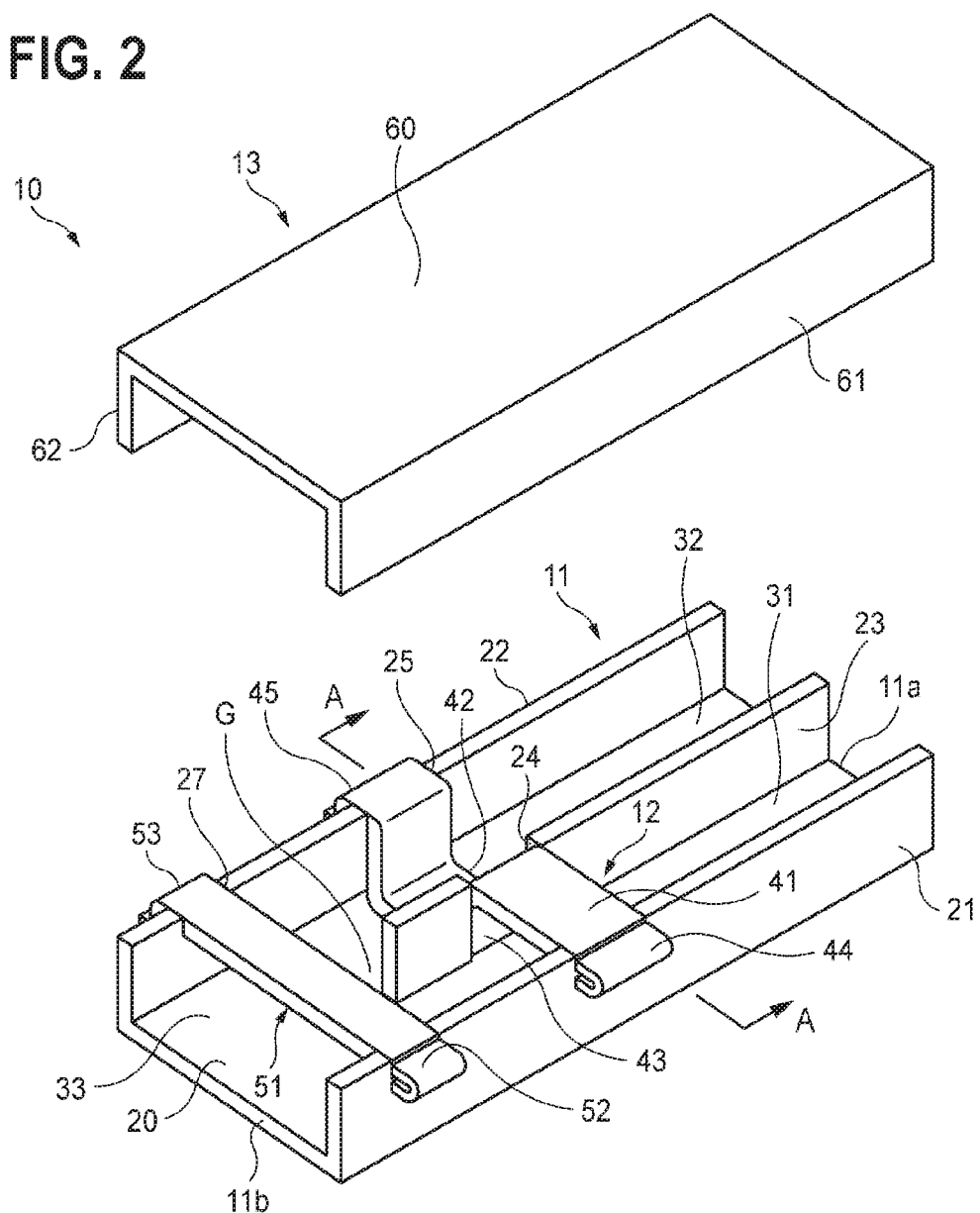
FIG. 2 is a perspective view in a case where the electric wire holding portion is disposed at an attachment position in the protector for the wire harness according to the embodiment.
Figure 3:
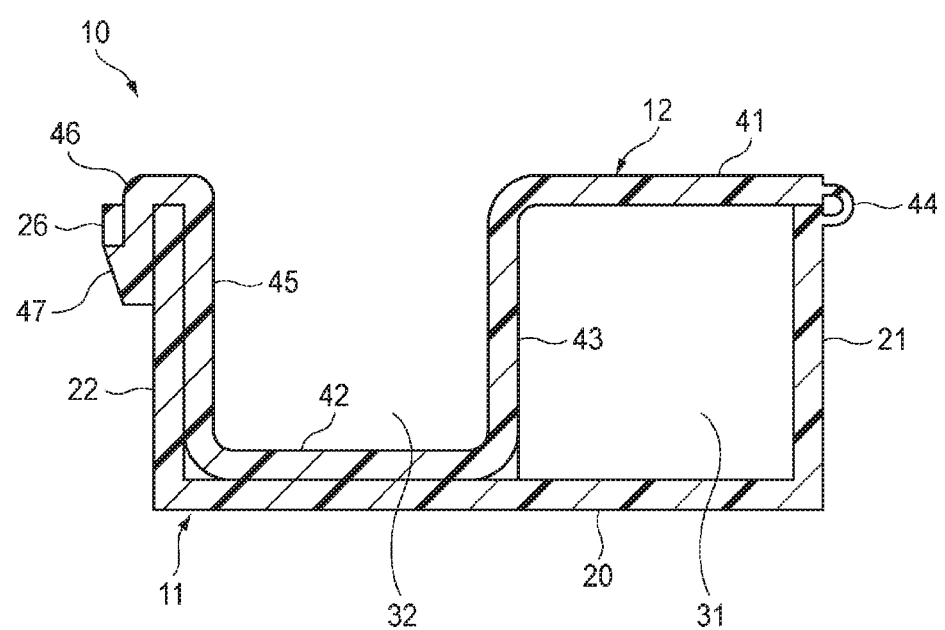
FIG. 3 is a cross-sectional view along a line A-A in FIG. 2.

As shown in FIGS. 1 to 3, a protector for a wire harness according to the embodiment (hereinafter, referred to as "protector 10") includes a body portion 11, an electric holding portion 12 and a cover portion 13. The body portion 11, the electric holding portion 12 and the cover portion 13 are formed from a synthetic resin. The protector 10 is mounted to electric wire groups bundling a plurality of electric wires to configure the wire harness. The protector 10 is, for example, fixed to a predetermined position of a vehicle. Accordingly, the wire harness is routed in a vehicle body.

The body portion 11 defines a plurality of paths through which the electric wires configuring the wire harness can pass. The body portion 11 includes a bottom plate portion 20, a first side wall 21, a second side wall 22 and a partition wall 23. The bottom plate portion 20 forms in a long plate shape, and the first side wall 21 and the second side wall 22 are erected upward from a side edge of the bottom plate portion 20. The partition wall 23 is erected on a substantially central portion in a width direction of the bottom plate portion 20, and the first side wall 21 and the second side wall 22 are disposed in parallel. The partition wall 23 extends partway from a side of one end 11a to the other end 11b of the body portion 11 along a longitudinal direction of the bottom plate portion 20.

Figure 4:
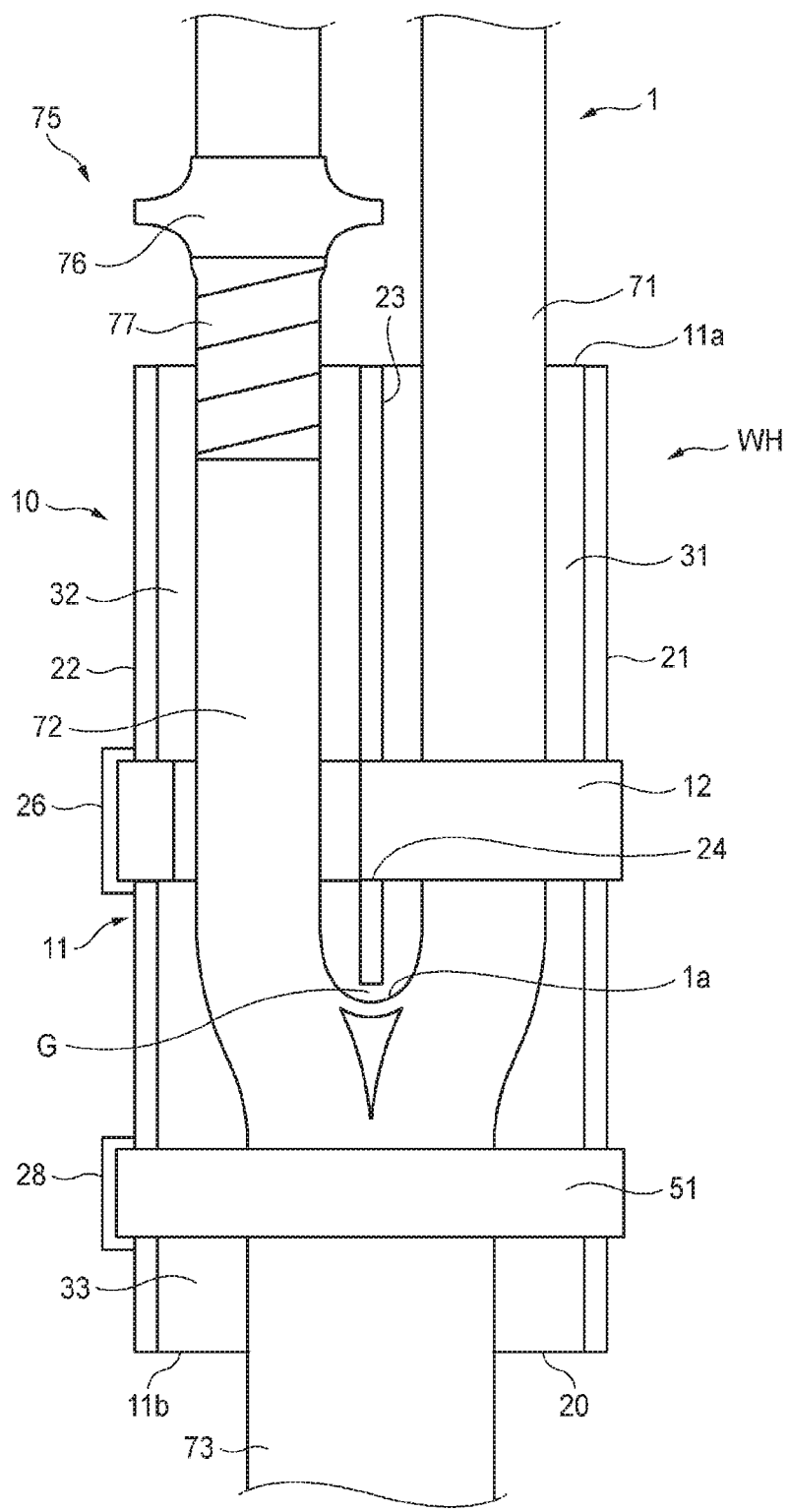
FIG. 4 is a plan view of the wire harness whose electric wire is housed in a body portion of the protector.

The body portion 11 includes, as the plurality of the paths through which the electric wires pass, a first path 31, a second path 32 and a third path 33 (see FIG. 4 for the situation that the electric wires are housed in each of the paths). The first path 31 and the second path 32 are adjacent to each other, and the third path 33 is provided at a position where the first path 31 and the second path 32 are merged such that the first path 31 and the second path 32 are connected in the longitudinal direction of the body portion 11.

The first path 31 and the second path 32 are partitioned by the partition wall 23 formed on a substantially central position in the width direction of the body portion 11. Accordingly, the first side wall 21 is disposed at a position opposite to the partition wall 23 with the first path 31 interposed therebetween, and the second side wall 22 is disposed at a position opposite to the partition wall 23 with the second path 32 interposed therebetween. Further, the partition wall 23 includes a communication portion 24. The communication portion 24 is a part where a wall portion of the partition wall 23 is cut out (the wall portion is not present), and a part where the first path 31 and the second path 32 are communicated with each other through the communication portion 24. The communication portion 24 is formed at a position away from a merging position G between the first path 31 and the second path 32 and near an end portion at a side of the third path 33.

The electric wire holding portion 12 is a member for holding the electric wires, and includes a holding piece 41, an engaging piece 42 and an intermediate piece 43. The electric wire holding portion 12 is provided integrally (via a hinge portion 44 to be described later) with the body portion 11, and is fixable to the body portion 11 in a state of holding the electric wires. An end portion of the holding piece 41 of the electric wire holding portion 12 is rotatably connected to an upper edge portion of the first side wall 21 of the body portion 11 via the hinge portion 44. The electric wire holding portion 12 includes the holding piece 41, the intermediate piece 43 and the engaging piece 42 in order from a side where the electric wire holding portion 12 is connected with the first side wall 21 by the hinge portion 44. In other words, the electric wire holding portion 12 is configured such that the holding piece 41 and the engaging piece 42 are connected by the intermediate piece 43.

As shown in FIG. 2, the electric wire holding portion 12 is housed in the body portion 11 by rotating around the hinge portion 44. In other words, the electric wire holding portion 12 is movable from a retreat position outside the body portion 11 (a position shown in FIG. 1) to an attachment position housed in the body portion 11 (a position shown in FIGS. 2 and 3) by rotating around the hinge portion 44.

The holding piece 41 is disposed so as to extend toward an upper end of the partition wall 23 from an upper end of the first side wall 21 in the attachment position (the position shown in FIGS. 2 and 3). Accordingly, an upper side of the first path 31 formed between the first side wall 21 and the partition wall 23 is covered by the holding piece 41 of the electric wire holding portion 12.

The engaging piece 42 is disposed so as to extend toward from a lower end of the second side wall 22 from a lower end of the partition wall 23 in the attachment position (the position shown in FIGS. 2 and 3). Accordingly, the engaging piece 42 passes a lower side of the second path 32 formed between the second side wall 22 and the partition wall 23.

Further, the intermediate piece 43 is disposed so as to block the communication portion 24 of the partition wall 23 in the attachment position (the position shown in FIGS. 2 and 3).

Referring back to FIG. 1, the engaging piece 42 includes an engaging portion 45 on an end portion of the engaging piece 42 at a side opposite to the intermediate piece 43. The engaging portion 45 extends toward an upper end side from the engaging piece 42 along an inner surface of the second side wall 22 (also see FIG. 3). Further, the engaging portion 45 includes a folded portion 46. The folded portion 46 extends so as to be folded toward an outer surface side of the second side wall 22 on an upper end of the second side wall 22 in the attachment position (the position shown in FIGS. 2 and 3). An engaging claw 47 is formed on the folded portion 46.

Further, the body portion 11 includes an electric wire holding portion 51 different from the electric wire holding portion 12 at a side of the third path 33. The electric wire holding portion 51 is provided integrally (via a hinge portion 52 to be described later) with the body portion 11, and is fixable to the body portion 11 in a state of being stretched from the upper end of the first side wall 21 to the upper end of the second side wall 22 so as to cover an upper side of the third path 33 in the attachment position (the position shown in FIG. 2). One end of the electric wire holding portion 51 is rotatably connected to the upper edge portion of the first side wall 21 of the body portion 11 via the hinge portion 52.

As shown in FIG. 2, the electric wire holding portion 51 is housed in the body portion 11 by rotating around the hinge portion 52. In other words, the electric wire holding portion 51 is movable from the retreat position outside the body portion 11 (the position shown in FIG. 1) to the attachment position housed in the body portion 11 (the position shown in FIG. 2) by rotating around the hinge portion 52. The electric wire holding portion 51 includes an engaging portion 53 on the other end side opposite to one end having the hinge portion 52. The engaging portion 53 includes a folded portion 54 extending so as to be folded toward the outer surface side of the second side wall 22 in the attachment position (the position shown in FIG. 2), and an engaging claw 55 is formed on the folded portion 54.

Referring back to FIG. 1, the first side wall 21 configuring the body portion 11 includes an engaging recess portion 25, to which the engaging portion 45 of the electric wire holding portion 12 is fitted, and an engaging recess portion 27, to which the electric wire holding portion 51 is fitted, on the upper end thereof. Further, the body portion 11 includes an engaged portion 26 corresponding to the engaging portion 45 of the electric wire holding portion 12 at a side of an outer surface of the first side wall 21 (also see FIG. 3), and an engaged portion 28 corresponding to the engaging portion 53 of the electric wire holding portion 51 on the outer surface of the first side wall 21. Both ends of the engaged portions 26, 28 are respectively fixed to the outer surface of the first side wall 21, and the engaged portions 26, 28 are respectively disposed with gaps with respect to the outer surface of the first side wall 21. The engaging claw 47 is engaged with the engaged portion 26 by inserting the engaging portion 45 of the electric wire holding portion 12 to the gap between the engaged portion 26 and the outer surface of the first side wall 21. Further, the engaging claw 55 is engaged with the engaged portion 28 by inserting the engaging portion 53 of the electric wire holding portion 51 to the gap between the engaged portion 28 and the outer surface of the first side wall 21.

The cover portion 13 is attached to an upper portion of the body portion 11, and is a member for covering the electric wire holding portion 12 and the electric wire holding portion 51. The cover portion 13 includes an upper plate portion 60, a first side wall 61 and a second side wall 62. The upper plate portion 60 is formed in a long plate shape, and the first side wall 61 and the second side wall 62 extends downward from a side edge of the upper plate portion 60. The cover portion 13 is formed such that an interval between the inner surface sides of the first side wall 61 and the second side wall 62 is slightly larger than a width dimension of the body portion 11. Accordingly, the upper portion of the body portion 11 enters between the first side wall 61 and the second side wall 62 of the cover portion 13 by covering the cover portion 13 on the upper portion of the body portion 11. Accordingly, the cover portion 13 is attached to the upper portion of the body portion 11, and the upper sides of the first path 31, the second path 32 and the third path 33 of the body portion 11 are blocked by the cover portion 13 (also see the method for manufacturing the wire harness to be described later).

Next, the wire harness WH including the protector 10 and the plurality of the electric wires 1 will be described. FIG. 4 is a schematic view of the protector 10 housed in the plurality of the electric wires 1 viewed from above, and illustration of the cover portion 13 is omitted for convenience.

As shown in FIG. 4, the wire harness WH includes the protector 10 and the electric wires 1 held in the protector 10. The plurality of the electric wires 1 held in the protector 10 includes a first electric wire group 71, a second electric wire group 72 and a third electric wire group 73. The third electric wire group 73 is an electric wire group into which the first electric wire group 71 and the second electric wire group 72 are merged. In other words, the first electric wire group 71 and the second electric wire group 72 are branched from the third electric wire group 73. At least one electric wire 1a of the electric wires 1 is wired over the first electric wire group 71 and the second electric wire group 72 so as to be directed to the second path 32 from the first path 31 through the merging position G (that is, so as not to be directed to the third path 33).

Further, the second electric wire group 72 includes a routing component 75. In the embodiment, a grommet 76 fitted to a panel of the vehicle body, or the like, and a tape 77 for fixing the grommet 76 to the second electric wire group 72, as the routing component 75, are provided on the second electric wire group 72. The grommet 76 is fixed to the second electric wire group 72 by winding the tape 77 over a part of the grommet 76 and the second electric wire group 72.

In the protector 10, the first electric wire group 71 which is a part of the electric wires 1 is housed in the first path 31 of the body portion 11 and the second electric wire group 72 which is the other part of the electric wires 1 is housed in the second path 32 of the body portion 11. Further, in the protector 10, the third electric wire group 73 of the electric wires 1 is housed in the third path 33 of the body portion 11. Besides, a part of the electric wire 1a wired over the first electric wire group 71 and the second electric wire group 72 is housed in the body portion 11 so as to be directed to the second path 32 from the first path 31 through the merging position G.

In this manner, the first electric wire group 71 of the electric wires 1 housed in the body portion 11 of the protector 10 is held by the holding piece 41 of the electric wire holding portion 12, and the third electric wire group 73 is held by the electric wire holding portion 51. Further, the first electric wire group 71, the second electric wire group 72 and the third electric wire group 73 housed in the body portion 11 are held by attaching the cover portion 13 to the body portion 11 of the protector 10. Besides, the routing component 75 mounted to the second electric wire group 72 is disposed such that a winding portion of the tape 77 which is a part of the routing component 75 is positioned inside the protector 10.

Next, the manufacturing method for manufacturing the wire harness WH with the above-mentioned configuration will be described.

Figure 5:
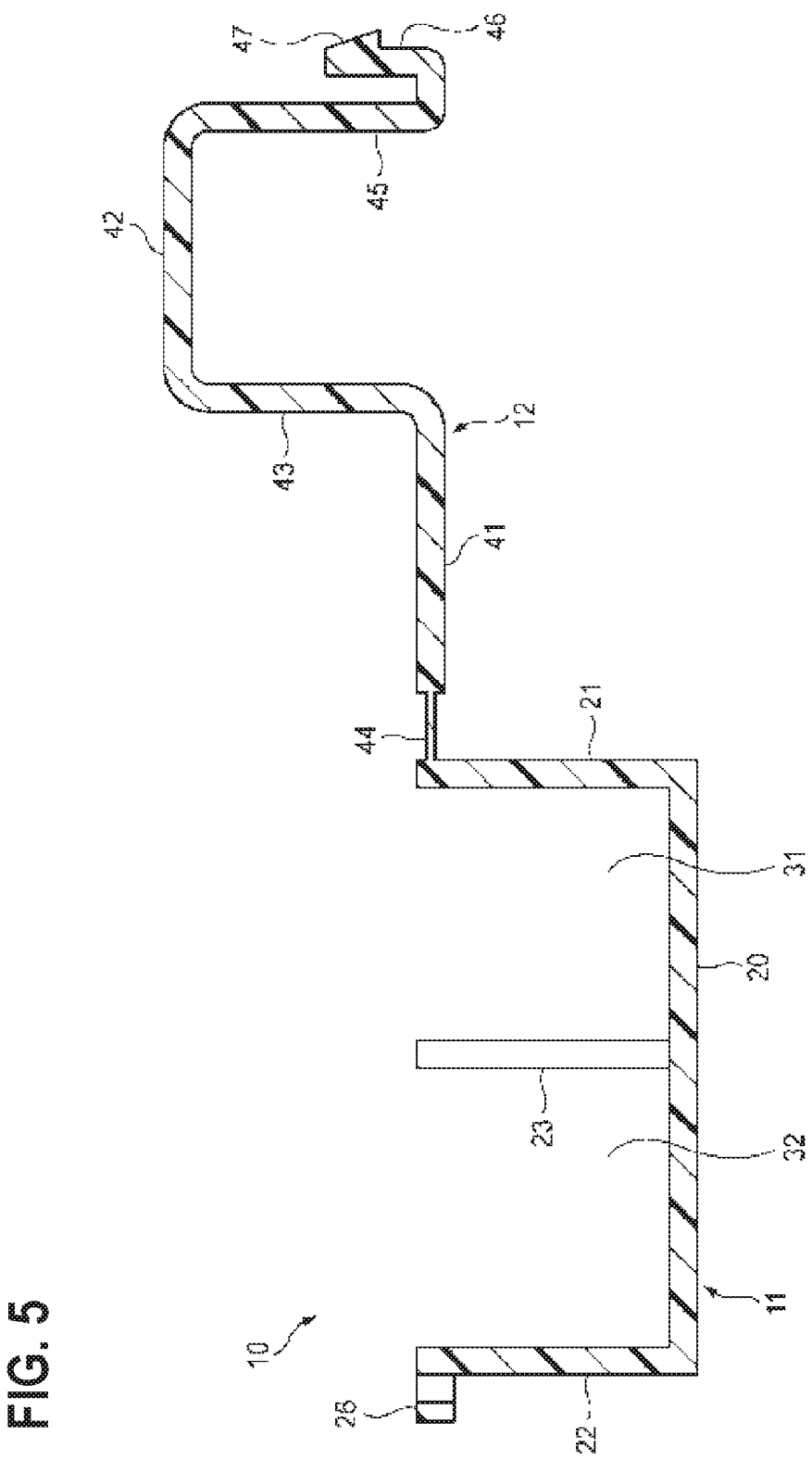
FIG. 5 is a schematic view for describing a method for manufacturing the wire harness, and a cross-sectional view in a direction orthogonal to an axial direction of a path of an electric wire group at a point of time before the electric wire group is housed in the protector.

As shown in FIG. 5, the body portion 11 of the protector 10 is disposed at a predetermined position on a jig plate, and the electric wire holding portion 12 (and the electric wire holding portion 51 which is not shown) is disposed at the retreat position.

Figure 6:
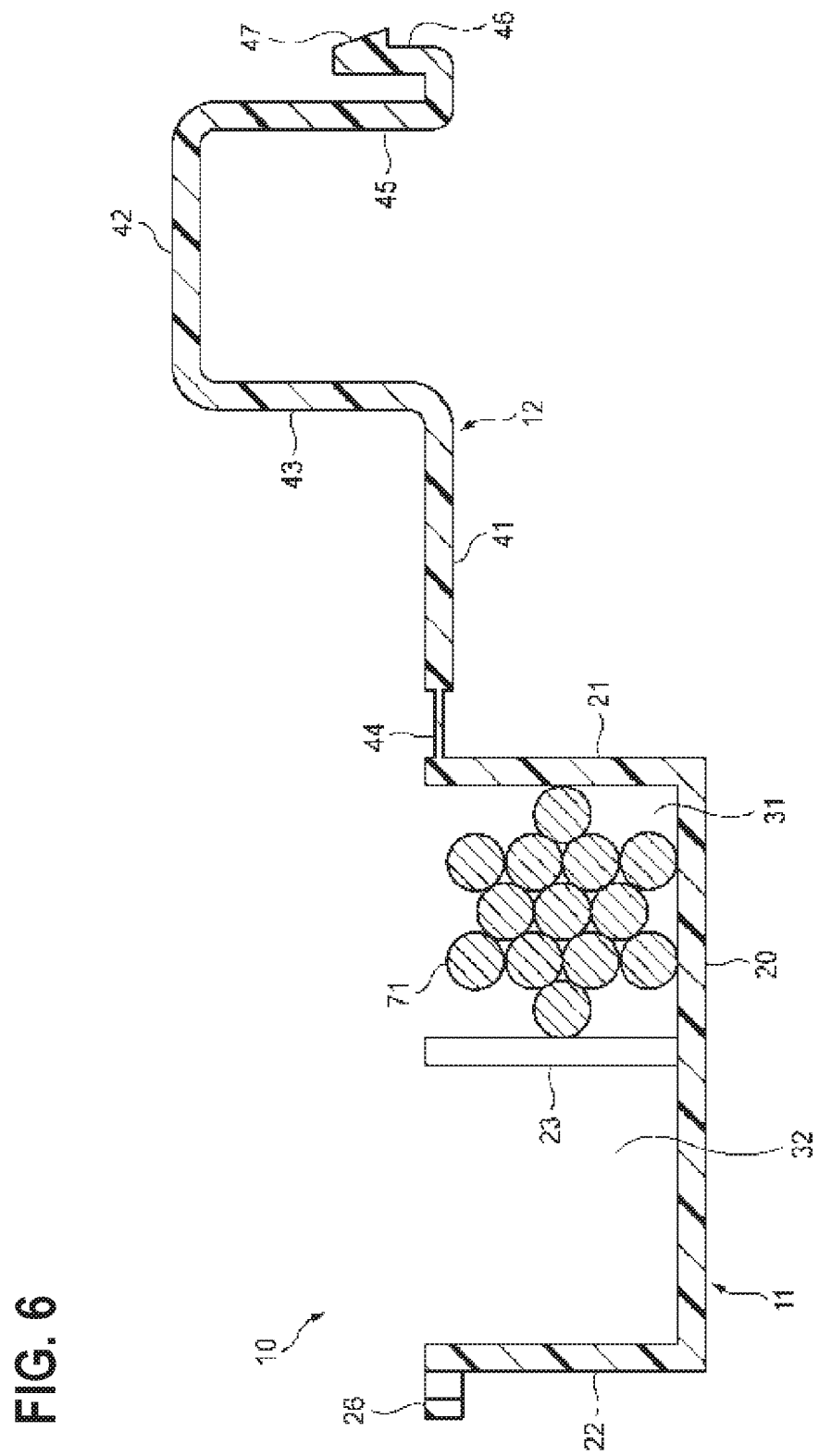
FIG. 6 is a schematic view for describing the method for manufacturing the wire harness, and a cross-sectional view in the direction orthogonal to the axial direction of the path of the electric wire group at a point of time when a first electric wire is housed in the body portion of the protector.

Next, as shown in FIG. 6, the first electric wire group 71 is housed in the first path 31 of the body portion 11 (the first step). Incidentally, at this time, the third electric wire group 73 is housed in the third path 33 (not shown) of the body portion 11.

Figure 7:
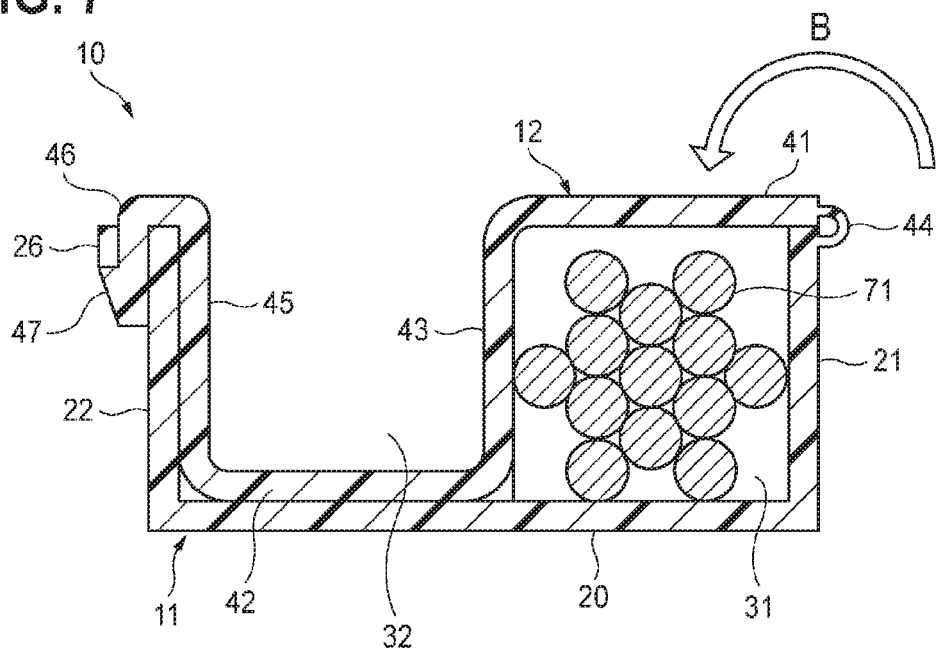
FIG. 7 is a schematic view for describing the method for manufacturing the wire harness, and a cross-sectional view in the direction orthogonal to the axial direction of the path of the electric wire group at a point of time when the electric holding portion is fixed to the body portion of the protector.

Next, as shown in FIG. 7, the electric wire holding portion 12 is moved to the attachment position in the body portion 11 by rotating toward the inner side of the body portion 11 (in a direction of arrow B in FIG. 7), and the electric wire holding portion 12 is fixed to the body portion 11 by engaging the engaging claw 47 of the engaging portion 45 with the engaged portion 26. Accordingly, the upper side of the first path 31 is covered by the holding piece 41 of the electric wire holding portion 12, and the first electric wire group 71 housed in the first path 31 is held in the body portion 11 (the second step).

Further, the electric wire holding portion 51 (not shown) is rotated and moved to the attachment position, and the electric wire holding portion 51 is fixed to the body portion 11 by engaging the engaging claw 66 of the engaging portion 53 with the engaged portion 28. Accordingly, the upper side of the third path 33 is covered by the electric wire holding portion 51, and the third electric wire group 73 housed in the third path 33 is held in the body portion 11.

Next, the body portion 11 of the protector 10 is removed from the jig plate, and the body portion 11 is disposed on another workbench where the next steps are performed. On another workbench (in the embodiment, a workbench where a mounting mechanism for mounting the grommet 76 is provided), the routing component 75 (the grommet 76 and the tape 77) is attached to the second electric wire group 72. Particularly, the grommet 76 is disposed at a predetermined position through the second electric wire group 72, and the tape 77 is wound over the part of the grommet 76 and the second electric wire group 72. Accordingly, the routing component 75 (the grommet 76 and the tape 77) is fixed to a predetermined position of the second electric wire group 72.

Figure 8:
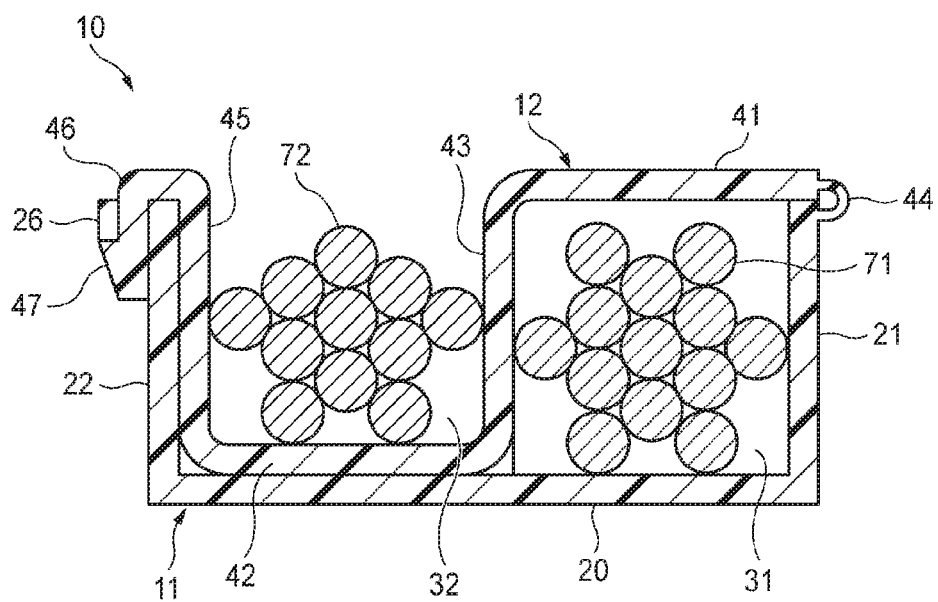
FIG. 8 is a schematic view for describing the method for manufacturing the wire harness, and a cross-sectional view in the direction orthogonal to the axial direction of the path of the electric wire group at a point of time when a first electric wire and a second electric wire are housed in the body portion of the protector.

Next, as shown in FIG. 8, the second electric wire group 72 to which the routing component 75 is mounted is housed in the second path 32 of the body portion 11 (the third step). Herein, when the second electric wire group 72 attaching the routing component 75 is housed in the second path 32 of the body portion 11, the winding portion of the tape 77 which is a part of the routing component 75 is disposed in the second path 32 (also see FIG. 4).

Figure 9:
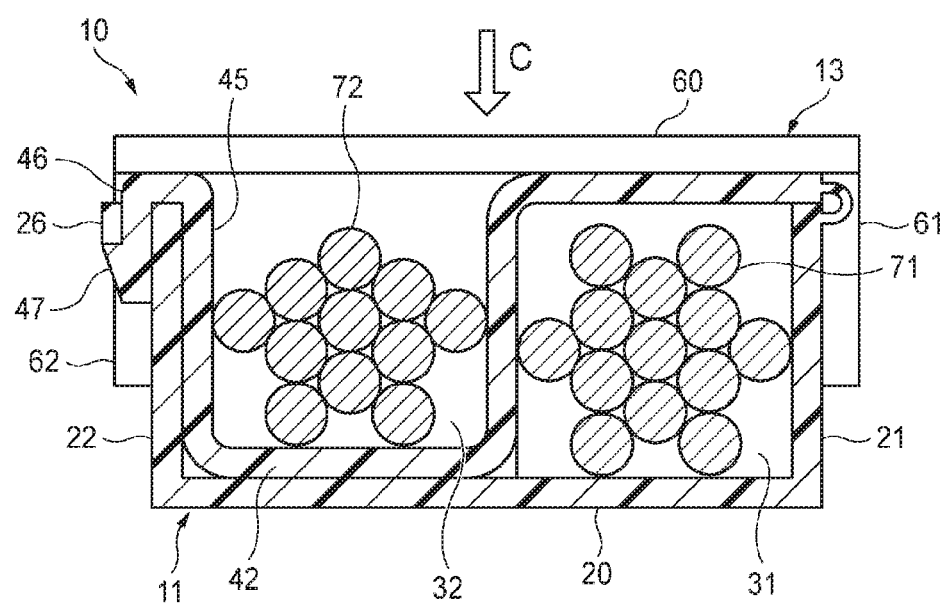
FIG. 9 is a schematic view for describing the method for manufacturing the wire harness, and a cross-sectional view in the direction orthogonal to the axial direction of the path of the electric wire group at a point of time when a cover portion is attached to the body portion of the protector.

Thereafter, as shown in FIG. 9, the cover portion 13 is fixed to the body portion 11 such that the cover portion 13 is moved from above the body portion 11 to the body portion 11 (in a direction of arrow C in FIG. 9), the cover portion 13 covers on the upper portion of the body portion 11, and the body portion 11 and the electric wire holding portion 12 (and the electric wire holding portion 51 which is not shown) are covered. Accordingly, the cover portion 13 is attached to the upper portion of the body portion 11, and the upper sides of the first path 31, the second path 32 and the third path 33 of the body portion 11 are blocked by the cover portion 13 (the forth step).

According to the above steps, the wire harness WH whose protector 10 is attached to the electric wires 1 including the first electric wire group 71, the second electric wire group 72 and the third electric wire group 73 can be manufactured.

As described above, according to the protector 10 of the present embodiment, after a part of the plurality of the electric wires 1 (the first electric wire group 71) forming the wire harness WH are housed in the first path 31 of the protector 10, the first electric wire group 71 housed in the first path 31 can be held by the holding piece 41 of the electric holding portion 12 passing through the upper side of the first path 31 if the electric wire holding portion 12 is fixed to the body portion 11 of the protector 10. Therefore, different from the conventional protector, the first electric wire group 71 housed in the first path 31 can be held without mounting the cover portion 13 to the body portion 11. Further, at this time, since the engaging piece 42 of the electric holding portion 12 is disposed so as to pass through the lower side of the second path 32, the second path 32 is kept in a state capable of housing the electric wires (the second electric wire group 72). In other words, since the first path 31 can house and hold the electric wires (the first electric wire group 71) and the second path 32 is kept in the state of being capable of housing the electric wires (the second electric wire group 72), the wire harness WH can be moved from one workbench to another workbench in a manufacturing process without fixing the cover portion 13 to the body portion 11 (that is, without finishing housing the electric wires 1 to the protector 10).

Thereafter, on another workbench having a destination (a workbench on which the grommet mounting mechanism is provided), after the other part of the plurality of the electric wires 1 (the second electric wire group 72) are housed in the second path 32 so as to pass through the upper side of the engaging piece 42, the cover portion 13 is mounted and fixed to the body portion 11, and thereby the second electric wire group 72 housed in the second path 32 can be held by the cover portion 13.

In this manner, according to the protector 10 of the embodiment, it is not necessary to finish mounting the protector 10 on each workbench. Therefore, compared to a case where mounting the protector to each workbench is finished like the conventional protector, the number of the protectors 10 required for the wire harnesses WH can be reduced.

Further, according to the protector 10 of the embodiment, a part of the electric wire holding portion (the intermediate piece 43) is disposed so as to block the cut out portion (the communication portion 24) formed in the partition wall 23, and the intermediate piece 43 becomes a part of the partition wall 23. Therefore, compared to a case where the communication portion 24 is not present in the partition wall 23 and the entire intermediate piece 43 is disposed in the path (the first path 31 or the second path 32), the projection amount of the intermediate piece 43 projected to the paths 31, 32 becomes small, and the volumes of the paths 31, 32 are increased. Consequently, according to the protector 10, the volumes of the paths in the protector 10 can be used maximally.

Further, according to the protector 10 of the embodiment, even in a case where the electric wire 1a from the first path 31 to the second path 32 through the merging position G is present in the electric wires 1 housed in the protector 10, the electric wire 1a will not enter the communication portion 24 since the electric wire 1a contacts with the partition wall 23 adjacent to the merging position G. Therefore, the electric wire 1a will be not interposed between the electric wire holding portion 12 (the intermediate piece 43 or the like) and the body portion 11. Consequently, compared to a case where the communication portion 24 at a position adjacent to the merging position G is present (in other words, the intermediate piece 43 of the electric wire holding portion 12 on the position adjacent to the merging position G is present), it is possible to prevent damage of the electric wire 1a, or the like.

Moreover, according to the protector 10 of the embodiment, the electric wire holding portion 12 can be easily fixed to the body portion 11 by rotating the electric wire holding portion 12 around the hinge portion 44. Therefore, compared to a case where the body portion 11 and the electric wire holding portion 12 are separate members which are separated, the workability of the step of housing the electric wires 1 in the first path 31 can be improved.

Further, according to the method for manufacturing the wire harness WH of the embodiment, after a part of the plurality of the electric wires 1 (the first electric wire group 71) forming the wire harness WH is housed in the first path 31 of the protector 1, the electric wire holding portion 12 is fixed to the protector 10, and thereby the first electric wire group 71 housed in the first path 31 can be held by the holding piece 41 of the electric wire holding portion 12 passing through the upper side of the first path 31. Therefore, different from the conventional protector, the first electric wire group 71 housed in the first path 31 can be held without mounting the cover portion 13 to the body portion 11. Further, at this time, since the engaging piece 42 of the electric holding portion 12 is disposed so as to pass through the lower side of the second path 32, the second path 32 is kept in a state capable of housing the electric wires (the second electric wire group 72). In other words, since a state where the first path 31 can house and hold the electric wires (the first electric wire group 71) and the second path 32 is kept in a state of housing the electric wires (the second electric wire group 72), the wire harness WH can be moved from one workbench to another workbench in a manufacturing process without mounting the cover 13 to the body portion 11 (that is, without finishing housing the electric wires 1 to the protector 10).

Thereafter, on another workbench having the destination (the workbench on which the grommet mounting mechanism is provided), after the other part of the plurality of the electric wires 1 (the second electric wire group 72) is housed in the second path 32 so as to pass through the upper side of the engaging piece 42, the cover portion 13 is mounted and fixed to the body portion 11, and thereby the second electric wire group 72 housed in the second path 32 can be held by the cover portion 13.

In this manner, according to the method for manufacturing the wire harness WH of the embodiment, it is not necessary to finish mounting the protector 10 on each workbench. Therefore, compared to a case where mounting the protector to each workbench is finished by using the conventional protector, the wire harness WH can be manufactured in a state where the number of the protectors 10 required for the wire harnesses WH can be reduced.

Further, according to the method for manufacturing the wire harness WH of the embodiment, the tape 77 which is at least a part of the routing component 75 including the grommet 76 and the tape 77 is positioned inside the protector 10. Therefore, compared to a case where the entire routing component 75 is exposed outside the protector 10, the damage of the routing component 75 can be reduced. Further, when the wire harness WH is routed in the vehicle or the like, the routing component 75 along with the protector 10 can be fixed to the vehicle or the like. Besides, the workability of manufacturing the wire harness WH is improved by integrally handling the routing component 75 and the protector 10. Incidentally, the routing component 75 is not limited to the grommet 76 or the tape 77, and may be the clamp fixed to the electric wires 1, or the like.

Next, modifications of the protector 10 will be described.

Incidentally, the same reference numerals are attached to the portions having the same configuration as those in the above-mentioned embodiment, and the description thereof will be omitted.

Modification 1

Figure 10:
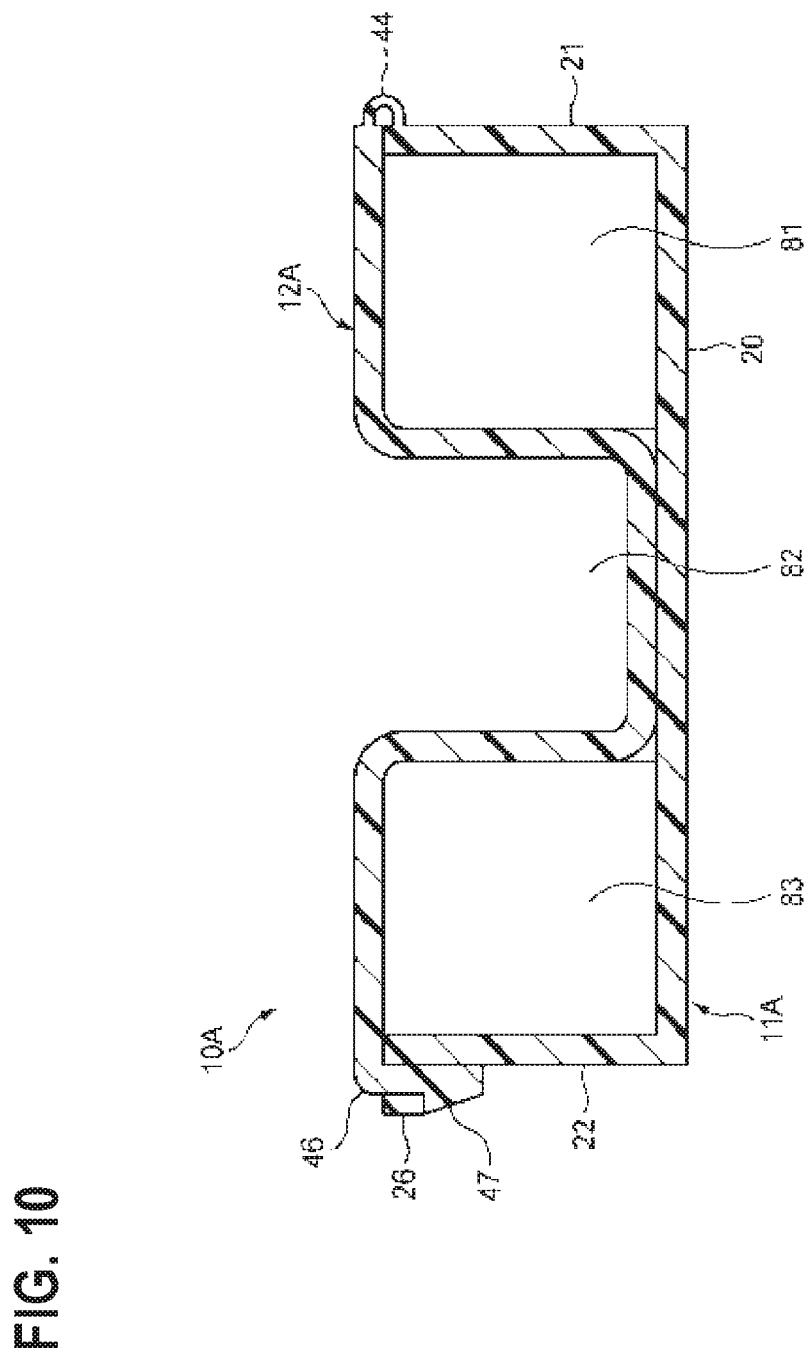
FIG. 10 is a cross-sectional view in a direction orthogonal to an axial direction of a path of an electric wire group of a protector according to Modification 1.

As shown in FIG. 10, a protector 10A according to Modification 1 includes a body portion 11A on which three paths 81 to 83 are disposed in parallel. Further, the protector 10A includes an electric wire holding portion 12A whose central portion projects downward and is formed in a recessed shape.

In the protector 10A according to Modification 1, after electric wire groups are housed in the paths 81, 83 at two sides of the body portion 11A, the electric wire groups housed in the paths 81, 83 can be held in the body portion 11A by fixing the electric wire holding portion 12A to the body portion 11A. Therefore, in a state of holding the electric wire groups housed in the paths 81, 83, the wire harness WH can be moved from one workbench to another workbench in a manufacturing process without fixing the cover portion 13 to the body portion 11A. Further, after holding the electric wire groups in the paths 81, 83, the electric wire group is housed in the path 82 and the cover portion 13 is attached to the body portion 11A, and thereby the electric wire group housed in the path 82 can be held.

Modification 2

Figure 11:
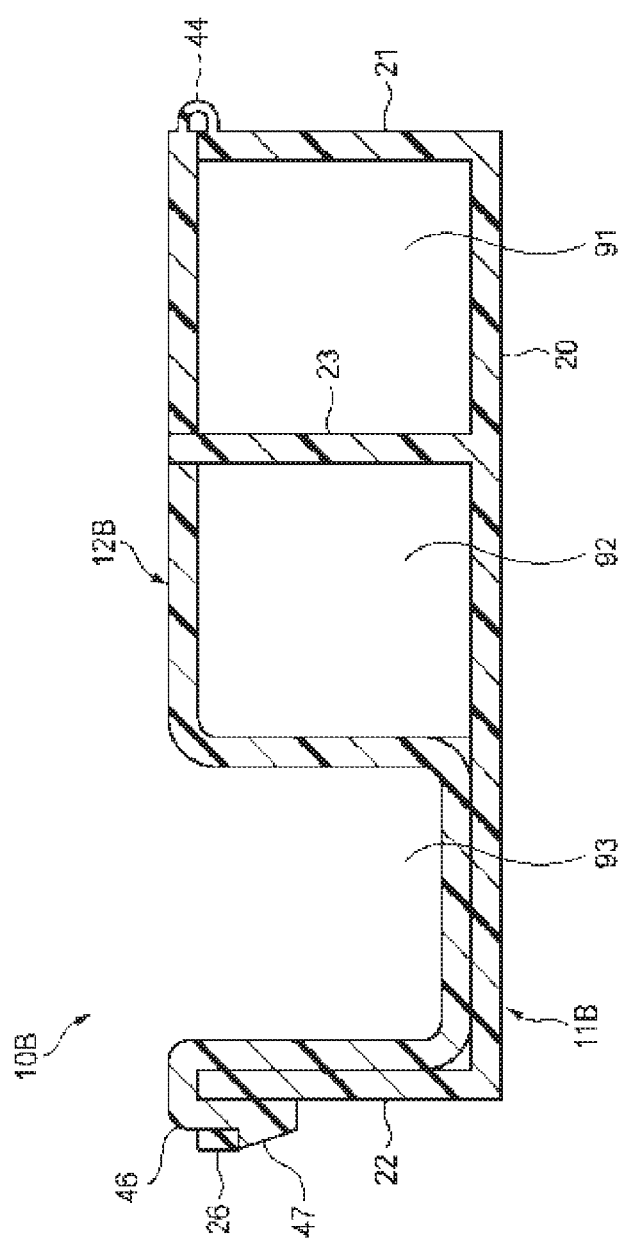
FIG. 11 is a cross-sectional view in a direction orthogonal to an axial direction of a path of an electric wire group of a protector according to Modification 2.

As shown in FIG. 11, a protector 10B according to Modification 2 includes a body portion 11B on which three paths 91 to 93 are disposed in parallel. Further, the protector 10B includes an electric wire holding portion 12B whose opposite side to the hinge portion 44 projects downward and is formed in a recessed shape.

In the protector 10B according to Modification 2, after electric wire groups are housed in the path 91 at a side of the hinge portion 44 and the central path 92 of the body portion 11B, the electric wire groups housed in the paths 91, 92 can be held in the body portion 11B by fixing the electric wire holding portion 12B to the body portion 11B. Therefore, in a state of holding the electric wire groups housed in the paths 91, 92, the wire harness WH can be moved from one workbench to another workbench in a manufacturing process without fixing the cover portion 13 to the body portion 11B. Further, after holding the electric wire groups in the paths 91, 92, the electric wire group is housed in the path 93 and the cover portion 13 is attached to the body portion 11B, and thereby the electric wire group housed in the path 93 can be held.

The present invention is not limited to the above-mentioned embodiments, and various modifications can be adopted within the scope of the present invention. For example, the present invention is not limited to the above-mentioned embodiments, but may be appropriately modified, improved, or the like. In addition, materials, shapes, dimensions, numbers, disposition locations, or the like of the constituent elements in the above-mentioned embodiments are optional as long as the present invention can be achieved, and are not limited.

For example, in each embodiment described above, the protector 10 includes the body portion 11 and the cover portion 13 which are respectively separated. However, the protector 10 may be configured so as to have an integrated configuration that the body portion 11 and the cover portion 13 are connected by a hinge or the like. Further, in the embodiments described above, the body portion 11 and the electric wire holding portion 12 are connected by the hinge portion 44. However, the electric wire holding portion 12 may be configured as a separate member separated from the body portion 11. In this case, the engaging portion and the engaged portion for engaging the holding piece 41 of the electric wire holding portion 12 with the first side wall 21 of the body portion 11 may be provided on the holding piece 41 and the first side wall 21.

Herein, characteristics of the embodiments of the protector for the wire harness and the method for manufacturing the wire harness according to the present invention described above are summarized in the following (1) to (6), respectively.

(1) (Mainly See FIGS. 1 to 4)

A protector (10) for a wire harness including a body portion (11) having a plurality of paths through which electric wires (1) of the wire harness (WH) is capable of passing, an electric wire holding portion (12) for holding the electric wires, and a cover portion (13) for covering the body portion (11) and the electric wire holding portion (12), wherein the body portion (11) includes a first path (31) and a second path (32) of the plurality of the paths, which are partitioned by a partition wall (23), and also includes a first side wall (21) opposite to the partition wall (23), the first path (31) being interposed therebetween, and a second side wall (22) opposite to the partition wall (23), the second path (32) being interposed therebetween, and the electric wire holding portion (12) includes a holding piece (41) which is capable of being disposed so as to pass through an upper side of the first path (31) and extend toward the partition wall (23) from the first side wall (21), an engaging piece (42) which is capable of being disposed so as to pass through a lower side of the second path (32) and extend toward the second side wall (22) from the partition wall (23), and an intermediate piece (43) which connects the holding piece (41) and the engaging piece (42), and is fixable to the body portion (11).

(2) (Mainly See FIGS. 1 to 4)

The protector for the wire harness according to above-mentioned (1), wherein the partition wall (23) includes a communication portion (24) which communicates the first path (31) and the second path (32), and the intermediate piece (43) is capable of being disposed so as to block the communication portion (24).

(3) (mainly see FIGS. 1 to 4)

The protector for the wire harness according to above-mentioned (2), wherein the body portion (11) includes a third path (33) into which the first path (31) and the second path (32) are merged, and the partition wall (23) includes the communication portion (24) at a position away from a merging position (G) between the first path (31) and the second path (32).

(4) (mainly see FIGS. 1 to 4)

The protector for the wire harness according to any one of above-mentioned (1) to (3), wherein the electric wire holding portion (12) is configured such that the holding piece (41) is rotatably connected to the first side wall (21) via a hinge portion (44) and the engaging piece (42) includes an engaging portion (45) which is engageable with the second side wall (22), and the body portion (11) is configured so as to have an engaged portion (26) corresponding to the engaging portion (45).

(5) (Mainly See FIGS. 5 to 9)

A method for manufacturing a wire harness (WH) including a plurality of electric wires (1) and a protector (10) having a plurality of paths inside, the protector (10) includes:

a body portion (11) that contains a first path (31) and a second path (32), as the plurality of the paths, which are partitioned by a partition wall (23), and also includes a first side wall (21) opposite to the partition wall (23), the first path (31) being interposed therebetween, and a second side wall (22) opposite to the partition wall (23), the second path (32) being interposed therebetween;

an electric wire holding portion (12), which includes a holding piece (41) which is capable of being disposed so as to pass through an upper side of the first path (31) and extend toward the partition wall (23) from the first side wall (21), an engaging piece (42) which is capable of being disposed so as to pass through a lower side of the second path (32) and extend toward the second side wall (22) from the partition wall (23), and an intermediate piece (43) which connects the holding piece (41) and the engaging piece (42), and is fixable to the body portion (11); and a cover portion (13) that covers the body portion (11) and the electric wire holding portion (12), and the method for manufacturing the wire harness contains:

a first step of housing a first electric wire group (71) which is a part of the plurality of the electric wires (1) in the first path (31);

a second step of holding the first electric wire group (71) in the first path (31) by the holding piece (41) and fixing the electric wire holding portion (12) to the body portion (11) by the engaging piece (42);

a third step of housing a second electric wire group (72) which is the other part of the plurality of the electric wires (1) in the second path (32) such that the second electric wire group (72) passes through an upper side of the engaging piece (42); and a forth step of holding the second electric wire group (72) in the second path (32) by fixing the cover portion (13) in the body portion (11) so as to cover the body portion (11) and the electric wire holding portion (12).

(6) (mainly see FIGS. 5 to 9)

The method for manufacturing the wire harness according to above-mentioned (5), wherein the third step contains a step of mounting a routing component (75) to the second electric wire group (72), and a step of disposing the second electric wire group (72) in the second path (32) such that at least a part of the routing component (75) is positioned inside the protector (10).

Further, the other characteristics of the embodiments according to the present invention described above are summarized briefly in the following [7] to [9], respectively.

[7] (Mainly See FIGS. 1 to 4)

A wire harness, which is a wire harness (WH) including a plurality of electric wires (1) and a protector (10) which defines a plurality of paths inside, characterized in that:

the protector (10) includes:

a body portion (11), which contains a first path (31) and a second path (32), as the plurality of the paths, which are partitioned by a partition wall (23), and also includes a first side wall (21) opposite to the partition wall (23) with the first path (31) interposed therebetween and a second side wall (22) opposite to the partition wall (23) with the second path (32) interposed therebetween;

an electric wire holding portion (12), which includes a holding piece (41) which is disposed so as to pass through an upper side of the first path (31) and extend toward the partition wall (23) from the first side wall (21), an engaging piece (42) which is disposed so as to pass through a lower side of the second path (32) and extend toward the second side wall (22) from the partition wall (23), and an intermediate piece (43) which connects the holding piece (41) and the engaging piece (42), and is fixed to the body portion (11); and a cover portion (13) which covers the body portion (11) and the electric wire holding portion (12), and the plurality of the electric wires (1) are housed in the protector (10) in a state where the first electric wire group (71) which is a part of the plurality of the electric wires (1) are housed in the first path (31) and the second electric wire group (72) which is the other part of the plurality of the electric wires (1) are housed in the second path (32).

[8] (Mainly see FIGS. 1 to 4)

The wire harness according to [7], wherein the protector (10) is configured such that the body portion (11) includes a third path (33) into which the first path (31) and the second path (32) are merged, the partition wall (23) includes a communication portion (24) which is the communication portion (24) into which the first path (31) and the second path (32) are communicated and is formed at a position away from a merging position (G) between the first path (31) and the second path (32), and the intermediate piece (43) is disposed so as to block the communication portion (24), and the plurality of the electric wires (1) are housed in the protector (10) in a state where the third electric wire group (73) into which the first electric wire group (71) and the second electric wire group (72) are merged is housed in the third path (33) and there is at least one electric wire (1A) from the first path (31) to the second path (32) through the merging position (G).

[9] (mainly see FIGS. 1 to 4)

The wire harness according to [7] or [8], wherein the wire harness includes a routing component (75) mounted to the second electric wire group (72), and the routing component (75) is disposed such that at least a part of the routing component (75) is positioned inside the protector (10).

What is claimed is:

1. A protector for a wire harness comprising:
    a body portion that has a plurality of paths through which electric wires of the wire harness can pass;
    an electric wire holding portion that holds the electric wires; and
    a cover portion that covers the body portion and the electric wire holding portion,
        wherein the body portion includes a first path and a second path of the plurality of the paths, which are partitioned by a partition wall, and also includes a first side wall opposite to the partition wall, the first path being interposed therebetween, and a second side wall opposite to the partition wall, the second path being interposed therebetween, and
        the electric wire holding portion comprises a holding piece which is capable of being disposed so as to pass through an upper side of the first path and extend toward the partition wall from the first side wall, an engaging piece which is capable of being disposed so as to pass through a lower-most side of the second path and extend toward the second side wall from the partition wall, and an intermediate piece which connects the holding piece and the engaging piece, and is fixable to the body portion.

2. The protector for the wire harness according to claim 1, wherein
    the partition wall includes a communication portion which communicates the first path and the second path, and
    the intermediate piece is capable of being disposed so as to block the communication portion.

3. The protector for the wire harness according to claim 2, wherein
    the body portion includes a third path into which the first path and the second path are merged, and
    the partition wall includes the communication portion at a position away from a merging position between the first path and the second path.

4. The protector for the wire harness according to claim 1, wherein
    the electric wire holding portion is configured such that the holding piece is rotatably connected to the first side wall via a hinge portion and the engaging piece includes an engaging portion which is engageable with the second side wall, and
    the body portion is configured so as to include an engaged portion corresponding to the engaging portion.

5. A method for manufacturing a wire harness including a plurality of electric wires and a protector having a plurality of paths inside,
    wherein the protector includes:
        a body portion that contains a first path and a second path of the plurality of the paths, which are partitioned by a partition wall, and also includes a first side wall opposite to the partition wall, the first path being interposed therebetween, and a second side wall opposite to the partition wall, the second path being interposed therebetween;
        an electric wire holding portion that includes a holding piece which is capable of being disposed so as to pass through an upper side of the first path and extend toward the partition wall from the first side wall, an engaging piece which is capable of being disposed so as to pass through a lower-most side of the second path and extend toward the second side wall from the partition wall, and an intermediate piece which connects the holding piece and the engaging piece, and is fixable to the body portion; and
        a cover portion which covers the body portion and the electric wire holding portion, and
    the method for manufacturing the wire harness comprising:
        a first step of housing a first electric wire group which is a part of the plurality of the electric wires in the first path;
        a second step of holding the first electric wire group in the first path by the holding piece and fixing the electric wire holding portion to the body portion by the engaging piece;
        a third step of housing a second electric wire group which is the other part of the plurality of the electric wires in the second path such that the second electric wire group passes through an upper side of the engaging piece; and
        a forth step of holding the second electric wire group in the second path by fixing the cover portion in the body portion such that the second electric wire group covers the body portion and the electric wire holding portion.

6. The method for manufacturing a wire harness according to claim 5, wherein
    the third step contains a step of mounting a routing component to the second electric wire group, and a step of disposing the second electric wire group in the second path such that at least a part of the routing component is positioned inside the protector.

* * * * *